(12) United States Patent
Factor et al.

(10) Patent No.: US 11,144,356 B2
(45) Date of Patent: Oct. 12, 2021

(54) DYNAMIC DETERMINATION OF MEMORY REQUIREMENTS FOR FUNCTION AS A SERVICE MULTI-INVOCATION FLOWS

(71) Applicant: International Business Machines Corporation, Armonk, NY (US)

(72) Inventors: Michael Factor, Haifa (IL); Gil Vernik, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 16/667,942

(22) Filed: Oct. 30, 2019

(65) Prior Publication Data

US 2021/0132996 A1    May 6, 2021

(51) Int. Cl.
*G06F 9/50* (2006.01)
*G06F 11/30* (2006.01)
*G06F 12/02* (2006.01)
*G06F 9/48* (2006.01)

(52) U.S. Cl.
CPC .......... *G06F 9/5016* (2013.01); *G06F 9/4881* (2013.01); *G06F 11/3037* (2013.01); *G06F 12/023* (2013.01)

(58) Field of Classification Search
None
See application file for complete search history.

(56) References Cited

U.S. PATENT DOCUMENTS

| | | | | |
|---|---|---|---|---|
| 5,465,342 A | * | 11/1995 | Walsh ................ | G06F 12/0864 711/119 |
| 6,202,127 B1 | * | 3/2001 | Dean .................. | G06F 11/3466 711/117 |
| 6,442,585 B1 | * | 8/2002 | Dean .................... | G06F 9/5016 717/127 |

(Continued)

FOREIGN PATENT DOCUMENTS

CN          109324893          2/2019

OTHER PUBLICATIONS

Saha et al. "EMARS: Efficient Management and Allocation of Resources in Serverless" 2018 IEEE, pp. 827-830.*

(Continued)

*Primary Examiner* — Van H Nguyen
(74) *Attorney, Agent, or Firm* — Gregory J. Kirsch

(57) ABSTRACT

Embodiments of the present systems and methods may provide techniques to provide simple and accurate estimate of memory requirements for application invocation in a serverless environment. For example, a method may comprise selecting sample invocations of functions as a service from a larger plurality of invocations, submitting for execution the plurality of sample invocations and, for each sample invocation, submitting a specification of a memory size to be used for execution of each sample invocation, determining, whether the specification of the memory size to be used for execution of each sample invocation results in unsuccessful execution of at least some of the sample invocations due to insufficient memory and, if so, adjusting the specification of (Continued)

the memory size for at least some of the sample invocations, and submitting for execution at least those invocations in the larger plurality of invocations that were not included in the plurality of sample invocations.

18 Claims, 6 Drawing Sheets

(56) References Cited

U.S. PATENT DOCUMENTS

| | | | | |
|---|---|---|---|---|
| 6,728,949 B1 * | 4/2004 | Bryant | ............... | G06F 11/3409 |
| | | | | 712/233 |
| 7,007,150 B2 * | 2/2006 | Valentin | ............... | G06F 9/5016 |
| | | | | 711/147 |
| 8,650,163 B1 * | 2/2014 | Harnik | ................... | G06F 3/067 |
| | | | | 707/692 |

OTHER PUBLICATIONS

Zheng et al. "Optimizing MapReduce with Low Memory Requirements for Shared-Memory Systems" 2014 IEEE, 6 pages.*
Fritz Alder et al., "S-FaaS: Trustworthy and Accountable Function-as-a-Service using Intel SGX", arXiv, Oct. 14, 2018.
Tarek Elgamal et al., "Costless: Optimizing Cost of Serverless Computing through Function Fusion and Placement", arXiv, Nov. 23, 2018.

* cited by examiner

DYNAMIC DETERMINATION OF MEMORY REQUIREMENTS FOR FUNCTION AS A SERVICE MULTI-INVOCATION FLOWS

BACKGROUND

The present invention relates to techniques to provide dynamic memory size adaptation that may provide simple and accurate estimate of memory requirements for application invocation of functions as a service (FaaS) in a serverless environment.

Function as a Service (FaaS) is a type of serverless cloud computing services that provides a platform on which customers may develop, run, and manage applications providing desired functions without the requirement of building and maintaining the infrastructure that is generally associated with developing and launching such applications. Serverless computing is a cloud-computing model that abstracts server management and low-level infrastructure allocation away from application developers. In this model, allocation of resources is managed by the cloud provider instead of the application architect.

Cost models of FaaS are usually based on the requested memory multiplied by execution time multiplied by a unit price. Users typically provide the memory size required for the invocation during the registration phase of the serverless action. However, users have no effective way to estimate real memory consumption during the invocation phase. For example, an invocation may be created with 2 GB of memory, while actual memory usage at runtime may be only 128 MB. In this case, a user will be paying for sixteen times the memory they actually need.

To address this, a user may manually submit one invocation with a certain memory size, wait for its completion. In the case of an out of memory failure, due to the selected memory size being too small, the user may resubmit the invocation with a larger memory size. This becomes complex as may be necessary to submit multiple invocations in order to properly estimate memory consumption. Such a process is essentially a manual and slow search process. In addition, such a process may still not provide an adequate memory size since the amount of memory required may depend upon the input data which is dynamic. Further, serverless providers need to know the memory resources in advance of execution and cannot determine at run time how much memory an invocation requires.

Accordingly, a need arises for techniques to provide simple and accurate estimate of memory requirements for application invocation in a serverless environment.

SUMMARY

Embodiments of the present systems and methods may provide techniques to provide simple and accurate estimate of memory requirements for application invocation of functions as a service (FaaS) in a serverless environment. For example, embodiments may perform 'sampling' invocations and implement strategies for determining the right memory size. Embodiments may be integrated into any client-side framework to make dynamic determinations of the correct size memory allocation transparently to the user.

For example, in an embodiment, a method may be implemented in a computer system comprising a processor, memory accessible by the processor, computer program instructions stored in the memory and executable by the processor, and data stored in the memory and accessible by the processor, the method may comprise selecting, at the computer system, a plurality of sample invocations of functions as a service from a larger plurality of invocations of functions as a service to be executed, submitting for execution, from the computer system to a cloud service, the plurality of sample invocations of functions as a service and, for each sample invocation, submitting a specification of a memory size to be used for execution of each sample invocation, determining, at the computer system, whether the specification of the memory size to be used for execution of each sample invocation results in unsuccessful execution of at least some of the plurality of sample invocations due to insufficient memory and, if so, adjusting the specification of the memory size for at least some of the sample invocations, and submitting for execution, from the computer system to a cloud service, at least those invocations in the larger plurality of invocations that were not included in the plurality of sample invocations.

In embodiments, each specified memory size to be used for execution of each sample invocation may differ from another specified memory size by a step factor. The method may further comprise determining, at the computer system, an estimate of a runtime memory consumption of each sample invocation, adjusting, at the computer system, the specification of the memory size for at least some of the sample invocations by reducing the step factor, when all sample invocations have run successfully, determining, at the computer system, an average of the runtime memory consumption for all sample invocations, and submitting for execution, from the computer system to a cloud service, at least those invocations in the larger plurality of invocations that were not included in the plurality of sample invocations with a specification of memory size for the larger plurality of invocations based on the average of the runtime memory consumption for all sample invocations. Adjusting the specification of the memory size for at least some of the sample invocations may comprise when any of the plurality of sample invocations results in unsuccessful execution, iteratively increasing a number of sample invocations, and setting a current specification of the memory size based on a function of the current specification of the memory size and on the number of sample invocations until none of the plurality of sample invocations results in unsuccessful execution or until a maximum number of sample invocations has been reached. The method may further comprise submitting for execution, from the computer system to a cloud service, at least those invocations in the larger plurality of invocations that were not included in the plurality of sample invocations with a specification of memory size for the larger plurality of invocations based on a final value of the current specification of the memory size from the iterative process. The plurality of sample invocations of functions may be chosen randomly and the method may further comprise determining, at the computer system, an estimate of a runtime memory consumption of each sample invocation, calculating, at the computer system, a memory function based on a relationship of a size of an input data set to the determined runtime memory consumption and based on an average difference between a predicted memory usage and the determined runtime memory consumption, and submitting for execution, from the computer system to a cloud service, at least those invocations in the larger plurality of invocations that were not included in the plurality of sample invocations with a specification of memory size for the larger plurality of invocations based on the calculated memory function increased by a factor of a delta seen in a predictive accuracy of the function.

In an embodiment, a system may comprise a processor, memory accessible by the processor, computer program instructions stored in the memory and executable by the processor, and data stored in the memory and accessible by the processor to perform selecting, at the computer system, a plurality of sample invocations of functions as a service from a larger plurality of invocations of functions as a service to be executed, submitting for execution, from the computer system to a cloud service, the plurality of sample invocations of functions as a service and, for each sample invocation, submitting a specification of a memory size to be used for execution of each sample invocation, determining, at the computer system, whether the specification of the memory size to be used for execution of each sample invocation results in unsuccessful execution of at least some of the plurality of sample invocations due to insufficient memory and, if so, adjusting the specification of the memory size for at least some of the sample invocations, and submitting for execution, from the computer system to a cloud service, at least those invocations in the larger plurality of invocations that were not included in the plurality of sample invocations.

In an embodiment, a computer program product may comprise a non-transitory computer readable storage having program instructions embodied therewith, the program instructions executable by a computer, to cause the computer to perform a method comprising selecting, at the computer system, a plurality of sample invocations of functions as a service from a larger plurality of invocations of functions as a service to be executed, submitting for execution, from the computer system to a cloud service, the plurality of sample invocations of functions as a service and, for each sample invocation, submitting a specification of a memory size to be used for execution of each sample invocation, determining, at the computer system, whether the specification of the memory size to be used for execution of each sample invocation results in unsuccessful execution of at least some of the plurality of sample invocations due to insufficient memory and, if so, adjusting the specification of the memory size for at least some of the sample invocations, and submitting for execution, from the computer system to a cloud service, at least those invocations in the larger plurality of invocations that were not included in the plurality of sample invocations.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present systems and methods may provide techniques to provide simple and accurate estimate of memory requirements for application invocation in a serverless environment. For example, embodiments may perform 'sampling' invocations and implement strategies for determining the right memory size. Embodiments may be integrated into any client-side framework to make dynamic determinations of the correct size memory allocation transparently to the user.

Figure 1:
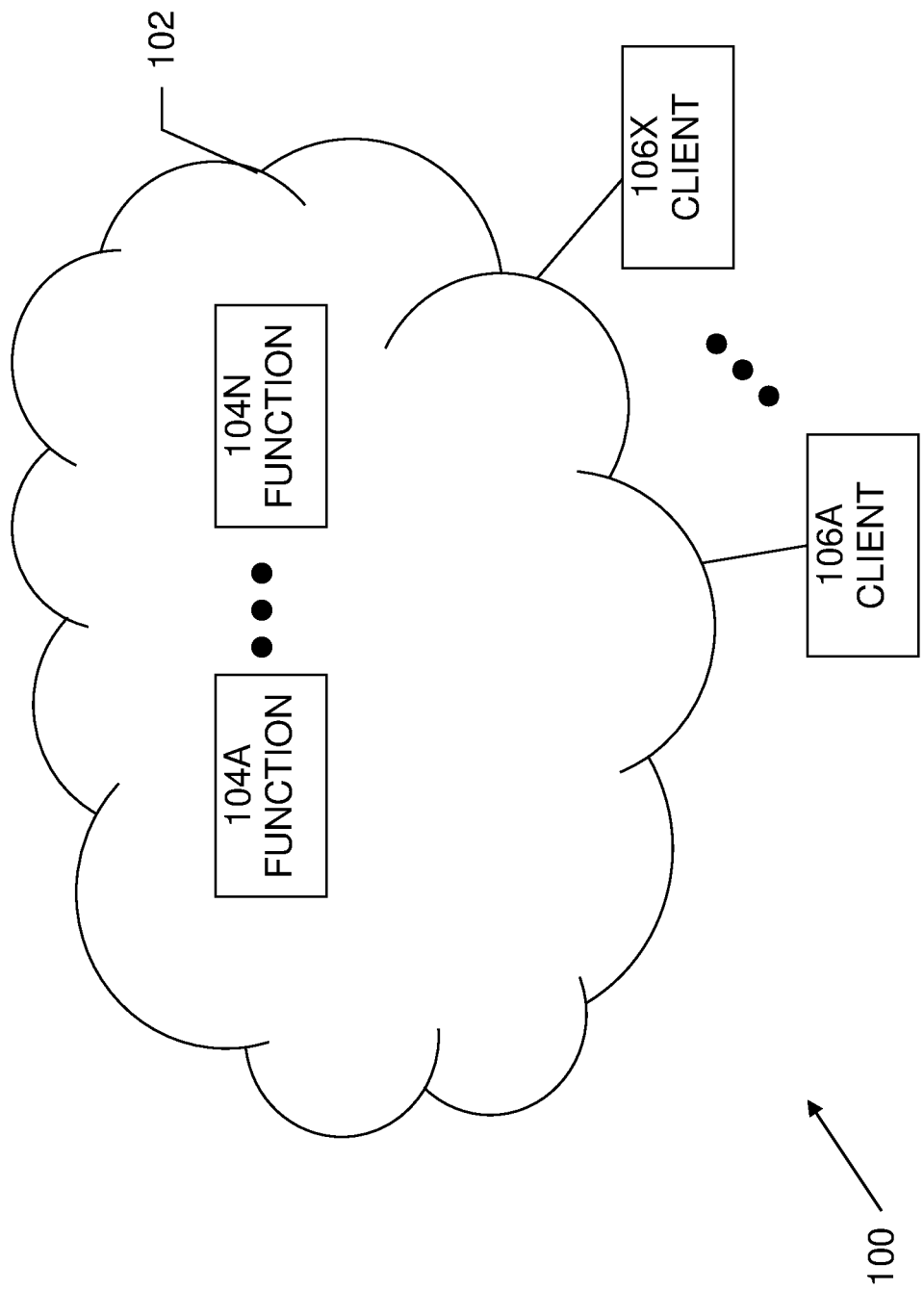
FIG. 1 is an exemplary block diagram of a system according to embodiments of the present systems and methods.

An exemplary block diagram of a system 100, according to embodiments of the present systems and methods, is shown in FIG. 1. In this example, system 100 includes cloud 102, function instances 104A-N, and client systems 106A-X. Cloud 102 may include data storage and computing resources that are typically implemented in data centers available to many users over the Internet, such as users operating client systems 106A-X. It is to be noted that a user may be a person operating a client system 106A-X, or a user may be an application or other software running on a client system 106A-X. In order to be a user of FaaS, the person or software need only attempt to invoke a function instance 104A-N. Cloud computing may provide on-demand availability of computer system resources without direct active management by the user. Function invocations. Among the cloud services that may be provided is Function as a Service (FaaS), in which client systems 106A-X may invoke and interact with function instances 104A-N. As shown in FIG. 1, typically, client systems 106A-X may only be aware of and interact with function instances 104A-N. All other system functions may be managed and maintained by the service provider.

Figure 2:
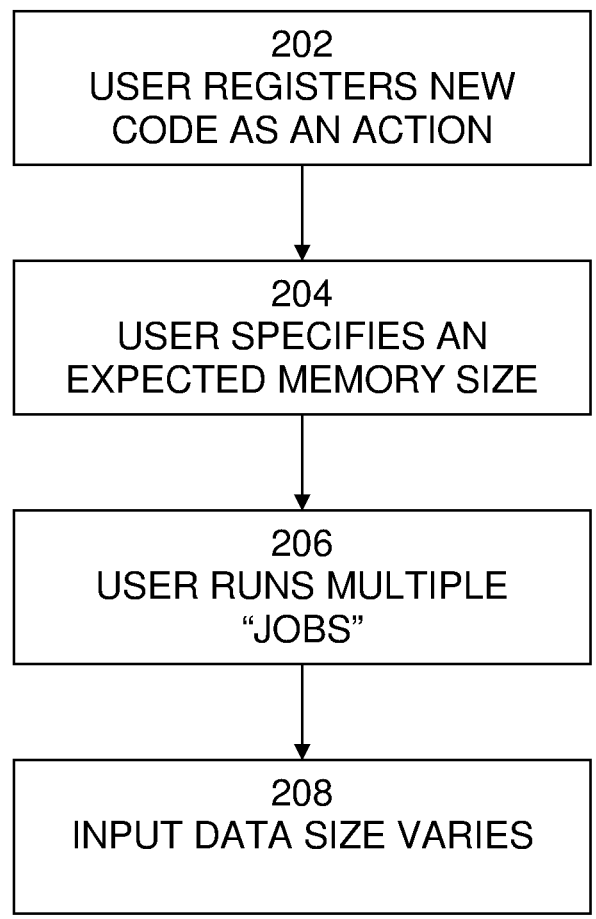
FIG. 2 is an exemplary flow diagram of a process of invoking a plurality of function instances according to embodiments of the present systems and methods.

An exemplary flow diagram of a process 200 of invoking a plurality of function instances 104A-N according to the present techniques is shown in FIG. 2. It is best viewed in conjunction with FIG. 1. Process 200 may begin with 202, in which a user, typically operating a client system 106A-X, may register a code module as an action, A, in cloud 102 as a FaaS. At 204, as part of the registration, the user may specify an expected memory size M that is required for the execution of A. At 206, a user may want to run a plurality of jobs at different time points, where each job, J, includes X invocations of the action A. At 208, the input data, D(J), to each single job is not static and may be dynamically generated, based on data from object storage, based on the data from a database or from any streaming source, etc. Therefore, the size of the input data may differ from one job invocation to another.

As an action A was registered in advance, each job, J, will invoke X invocations where each action A consumes M memory. However, as input data D(J) is dynamic and may change from job to job, the overall job memory consumption remains constant as X*M and is does not adapt to the input data. For example, less memory than the specified amount may be required based on the input data set for some invocations, in which case the cost of those invocations is unnecessarily higher than it should be. Likewise, it is possible that M maybe insufficient for other invocations, in which case those invocations may fail to run or complete properly. Further, within a job J, an invocation xi will operate on data item $d_i$ of size $s(d_i)$, where the different invocations in a job may be operating on different size, s.

In conventional systems, users may run sample invocations manually and try to find the best memory size for their jobs. Embodiments of the present systems and methods may dynamically adapt the memory size M(D) of actions during the job invocation, thus using less or more memory based on the actual job data input.

Figure 3:
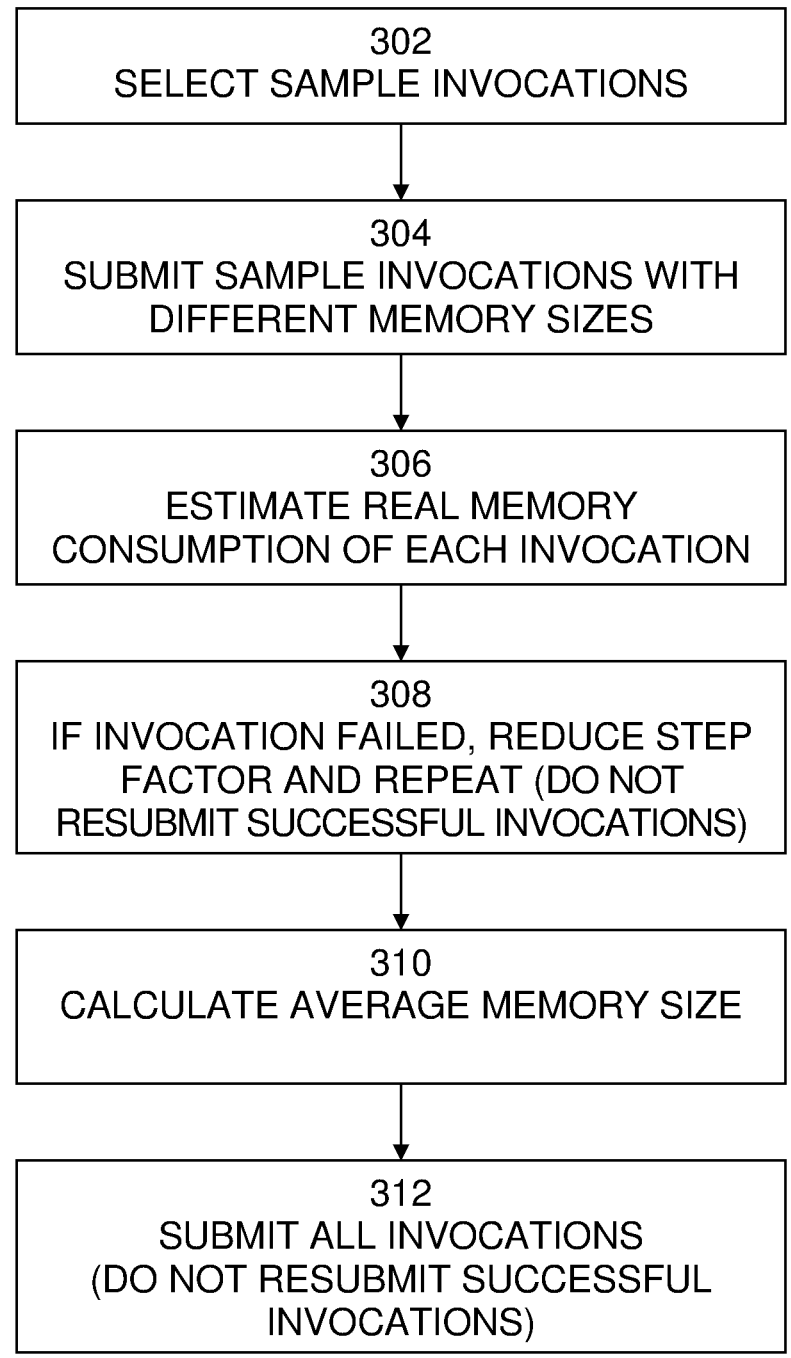
FIG. 3 is an exemplary flow diagram of a process of dynamic memory size adaptation according to embodiments of the present systems and methods.

An exemplary flow diagram of an embodiment of a process 300 of dynamic memory size adaptation according to the present techniques is shown in FIG. 3. Process 300 begins with 302, in which sample invocations may be selected. For example, the process may select S invocations out of X invocations required by the job. Sample invocations S may be selected randomly, periodically, based on input data size, or based on any other desired technique. At 304, the sample invocations S may be submitted with different specified memory sizes. For example, each sample invocation S may be submitted with a specified memory size equal to a starting memory size divided by a step factor, multiplied by a step factor, with a step factor added or subtracted, or any other technique for generating differing memory sizes. At 306, each sample invocation may be run and the real runtime memory consumption of each sample invocation may be estimated.

At 308, if a sample invocation fails, for example, due to insufficient memory, the memory sizes for the sample invocations may be increased, for example, by decreasing the division step factor. In embodiments, all sample invocations may be resubmitted using the newly determined memory sizes. In embodiments, only those sample invocations that failed may be resubmitted using the newly determined memory sizes and the successful invocations may not be resubmitted. At 310, when all sample invocations have run successfully, the estimated real runtime memory consumption of all sample invocations may be averaged (or calculated using any other function). At 312, the X invocations may be submitted using as the requested memory size for each invocation the average (or other function) memory size determined at 310. In embodiments, all X sample invocations may be resubmitted using memory size determined at 310. In embodiments, the successful invocations may not be resubmitted and only invocations that have not been run yet may be submitted using memory size determined at 310.

Figure 4:
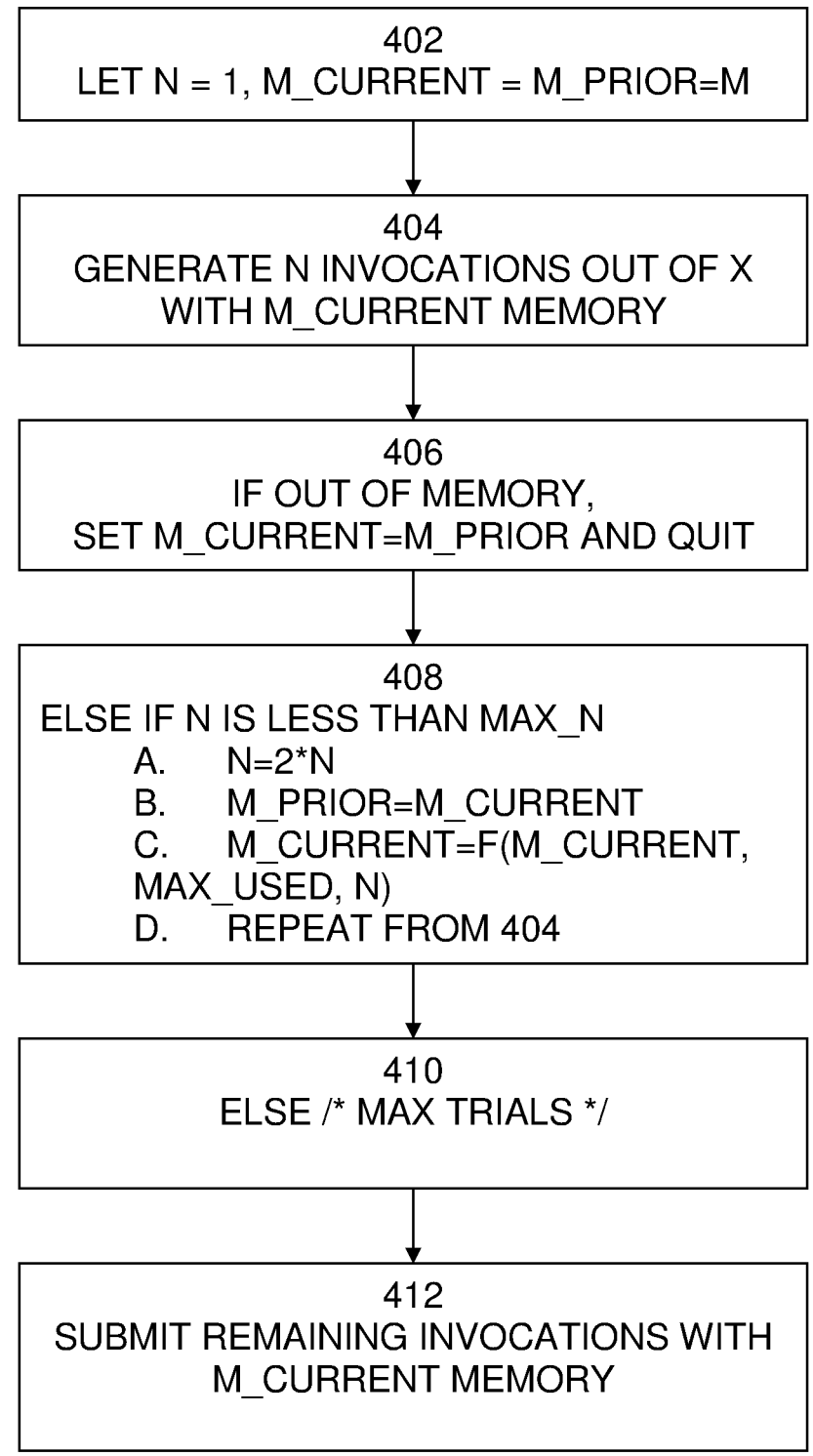
FIG. 4 is an exemplary flow diagram of a process of dynamic memory size adaptation according to embodiments of the present systems and methods.

An exemplary flow diagram of an embodiment of a process 400 of dynamic memory size adaptation according to the present techniques is shown in FIG. 4. Process 400 begins with 402, in which variables may be initialized as: the number of sample invocations n=1, and the current memory size and prior memory size m_current=m_prior=M. At 404, sample invocations may be selected by generating n invocations out of X with memory sizes specified as m_current. At 406, if any of the sample invocations failed to run or complete successfully due to insufficient memory, then m_current may be set equal to m_prior and the process may quit. At 408, if all of the sample invocations ran and completed successfully, then if the number of sample invocations n is less than a maximum number MAX_n, the following may be performed: a) n may be increased, for example, doubled, as in n=2*n; b) m_prior may be set equal to m_current; c) m_current may be set equal to a function f(m_current, max_used, n); and the process may be repeated from 404. At 408, an 'an optimal' next m_current value to be used for 404 may be estimated. An arbitrary function may be defined that may have any internal logic. This function may return an optimal next memory value to try for the next iteration. The input to the function may be the current_memory that was used, max_used may be an estimation of how much memory actually was consumed by sample invocations, and n may be the number of samples. An example of a function that may be used is the identify function, which may be defined as def f(m_current, max_used, n): return max_used+ threshold number The function shown is merely an example. The actual function used may also include any process or technique to estimate the next sampling memory.

At 410, if at 408, it was determined that the number of sample invocations n is not less than a maximum number MAX_n, then the maximum number of trials, /* max trials */, has been reached and at 412, the remaining invocations that have not yet been run may be run with specified memory equal to m_current.

Figure 5:
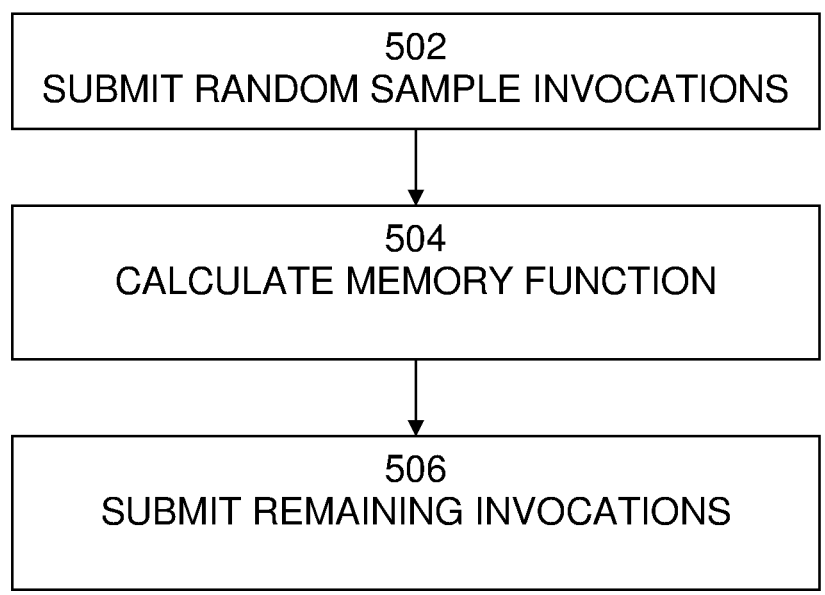
FIG. 5 is an exemplary flow diagram of a process of dynamic memory size adaptation to embodiments of the present systems and methods.

An exemplary flow diagram of an embodiment of a process 500 of dynamic memory size adaptation according to the present techniques is shown in FIG. 5. Process 500 begins with 502, in which a number n (number of samples) of randomly chosen invocations may be submitted and an estimate of the real runtime memory required for each submitted invocation may be determined. At 504, a memory function based on the relationship of the size of the input data set to the memory required and based on the average delta between the predicted memory usage and the actual memory usage may be calculated. At 506, the remaining invocations that have not yet been run may be run with each invocation's memory consumption based upon the function calculated at 504 and increased by a factor of the delta seen in the function's predictive accuracy. An example of a function that may be used is the identify function, which may be defined as def f(m_current, max_used, n): return max_used+ threshold number The function shown is merely an example. The actual function used may also include any process or technique to estimate the next sampling memory.

It is to be noted regarding processes 300, 400, and 500 each process may be used in addition to, in conjunction with, or instead of the other processes. Further, portions of each process may be included in the other processes or may be substituted for portions of the other processes. Further, other detailed processes may be used in addition to, in conjunction with, or instead of those processes.

Figure 6:
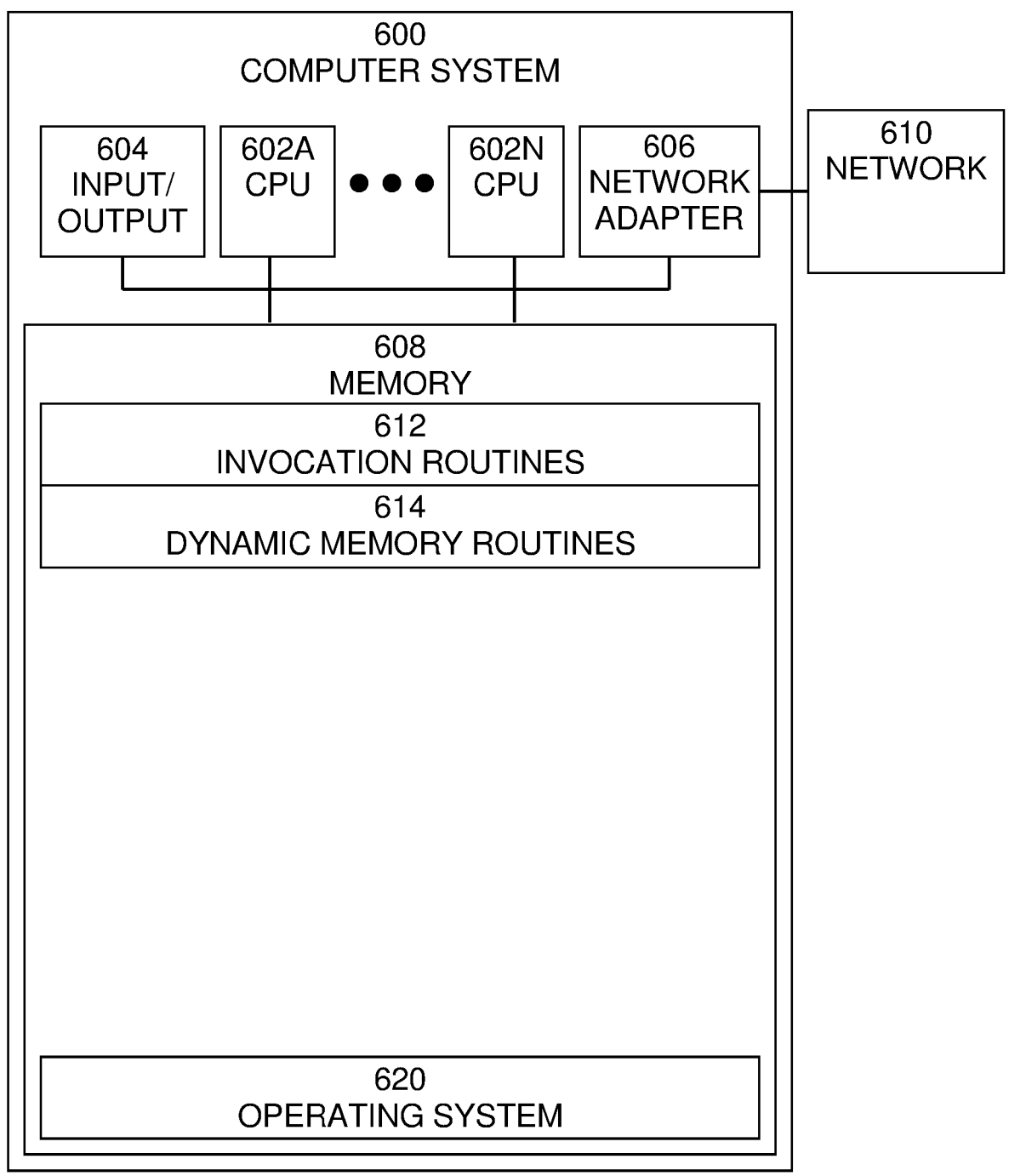
FIG. 6 is an exemplary block diagram of a computer system, in which processes involved in the embodiments described herein may be implemented.

An exemplary block diagram of a computer system 600, in which processes involved in the embodiments described herein may be implemented, is shown in FIG. 6. Computer system 600 may be implemented using one or more programmed general-purpose computer systems, such as embedded processors, systems on a chip, personal computers, workstations, server systems, and minicomputers or mainframe computers, or in distributed, networked computing environments. Computer system 600 may include one or more processors (CPUs) 602A-602N, input/output circuitry 604, network adapter 606, and memory 608. CPUs 602A-602N execute program instructions in order to carry out the functions of the present communications systems and methods. Typically, CPUs 602A-602N are one or more microprocessors, such as an INTEL CORE® processor. FIG. 6 illustrates an embodiment in which computer system 600 is implemented as a single multi-processor computer system, in which multiple processors 602A-602N share system resources, such as memory 608, input/output circuitry 604, and network adapter 606. However, the present communications systems and methods also include embodiments in which computer system 600 is implemented as a plurality of networked computer systems, which may be single-processor computer systems, multi-processor computer systems, or a mix thereof.

Input/output circuitry 604 provides the capability to input data to, or output data from, computer system 600. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 606 interfaces device 600 with a network 610. Network 610 may be any public or proprietary LAN or WAN, including, but not limited to the Internet.

Memory 608 stores program instructions that are executed by, and data that are used and processed by, CPU 602 to perform the functions of computer system 600. Memory 608 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 608 may vary depending upon the function that computer system 600 is programmed to perform. In the example shown in FIG. 6, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present systems and methods may include any and all such arrangements.

In the example shown in FIG. 6, memory 608 may include invocation routines 612, dynamic memory routines 614, and operating system 620. Invocation routines 612 may include software routines that format and transmit requests for invocation of functions in an FaaS service, as described above. Dynamic memory routines 614 may include software routines that determine memory specification for function invocations according to process 300, 400, and/or 500, or any other memory specification determination process, as described above. Operating system routines 620 may provide overall system functionality.

As shown in FIG. 6, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method implemented in a computer system comprising a processor, memory accessible by the processor, computer program instructions stored in the memory and executable by the processor, and data stored in the memory and accessible by the processor, the method comprising:
    selecting, at the computer system, a plurality of sample invocations of functions as a service from a larger plurality of invocations of functions as a service to be executed;
    submitting for execution, from the computer system to a cloud service, the plurality of sample invocations of functions as a service and, for each sample invocation, submitting a specification of a memory size to be used for execution of each sample invocation;
    determining, at the computer system, whether the specification of the memory size to be used for execution of each sample invocation results in unsuccessful execution of at least some of the plurality of sample invocations due to insufficient memory and, if so, adjusting the specification of the memory size for at least some of the sample invocations; and
    submitting for execution, from the computer system to a cloud service, at least those invocations in the larger plurality of invocations that were not included in the plurality of sample invocations.

2. The method of claim 1, wherein each specified memory size to be used for execution of each sample invocation differs from another specified memory size by a step factor.

3. The method of claim 2, further comprising:
    determining, at the computer system, an estimate of a runtime memory consumption of each sample invocation;
    adjusting, at the computer system, the specification of the memory size for at least some of the sample invocations by reducing the step factor;
    when all sample invocations have run successfully, determining, at the computer system, an average of the runtime memory consumption for all sample invocations; and
    submitting for execution, from the computer system to a cloud service, at least those invocations in the larger plurality of invocations that were not included in the plurality of sample invocations with a specification of memory size for the larger plurality of invocations based on the average of the runtime memory consumption for all sample invocations.

4. The method of claim 2, wherein adjusting the specification of the memory size for at least some of the sample invocations comprises:
when any of the plurality of sample invocations results in unsuccessful execution, iteratively increasing a number of sample invocations, and setting a current specification of the memory size based on a function of the current specification of the memory size and on the number of sample invocations until none of the plurality of sample invocations results in unsuccessful execution or until a maximum number of sample invocations has been reached.

5. The method of claim 4, further comprising submitting for execution, from the computer system to a cloud service, at least those invocations in the larger plurality of invocations that were not included in the plurality of sample invocations with a specification of memory size for the larger plurality of invocations based on a final value of the current specification of the memory size from the iterative process.

6. The method of claim 2, wherein the plurality of sample invocations of functions are chosen randomly and the method further comprises:
determining, at the computer system, an estimate of a runtime memory consumption of each sample invocation;
calculating, at the computer system, a memory function based on a relationship of a size of an input data set to the determined runtime memory consumption and based on an average difference between a predicted memory usage and the determined runtime memory consumption; and
submitting for execution, from the computer system to a cloud service, at least those invocations in the larger plurality of invocations that were not included in the plurality of sample invocations with a specification of memory size for the larger plurality of invocations based on the calculated memory function increased by a factor of a delta seen in a predictive accuracy of the function.

7. A system comprising a processor, memory accessible by the processor, computer program instructions stored in the memory and executable by the processor, and data stored in the memory and accessible by the processor to perform:
selecting, at the computer system, a plurality of sample invocations of functions as a service from a larger plurality of invocations of functions as a service to be executed;
submitting for execution, from the computer system to a cloud service, the plurality of sample invocations of functions as a service and, for each sample invocation, submitting a specification of a memory size to be used for execution of each sample invocation;
determining, at the computer system, whether the specification of the memory size to be used for execution of each sample invocation results in unsuccessful execution of at least some of the plurality of sample invocations due to insufficient memory and, if so, adjusting the specification of the memory size for at least some of the sample invocations; and
submitting for execution, from the computer system to a cloud service, at least those invocations in the larger plurality of invocations that were not included in the plurality of sample invocations.

8. The system of claim 7, wherein each specified memory size to be used for execution of each sample invocation differs from another specified memory size by a step factor.

9. The system of claim 8, further comprising:
determining, at the computer system, an estimate of a runtime memory consumption of each sample invocation;
adjusting, at the computer system, the specification of the memory size for at least some of the sample invocations by reducing the step factor;
when all sample invocations have run successfully, determining, at the computer system, an average of the runtime memory consumption for all sample invocations; and
submitting for execution, from the computer system to a cloud service, at least those invocations in the larger plurality of invocations that were not included in the plurality of sample invocations with a specification of memory size for the larger plurality of invocations based on the average of the runtime memory consumption for all sample invocations.

10. The system of claim 8, wherein adjusting the specification of the memory size for at least some of the sample invocations comprises:
when any of the plurality of sample invocations results in unsuccessful execution, iteratively increasing a number of sample invocations, and setting a current specification of the memory size based on a function of the current specification of the memory size and on the number of sample invocations until none of the plurality of sample invocations results in unsuccessful execution or until a maximum number of sample invocations has been reached.

11. The system of claim 10, further comprising submitting for execution, from the computer system to a cloud service, at least those invocations in the larger plurality of invocations that were not included in the plurality of sample invocations with a specification of memory size for the larger plurality of invocations based on a final value of the current specification of the memory size from the iterative process.

12. The system of claim 8, wherein the plurality of sample invocations of functions are chosen randomly, and the method further comprises:
determining, at the computer system, an estimate of a runtime memory consumption of each sample invocation;
calculating, at the computer system, a memory function based on a relationship of a size of an input data set to the determined runtime memory consumption and based on an average difference between a predicted memory usage and the determined runtime memory consumption; and
submitting for execution, from the computer system to a cloud service, at least those invocations in the larger plurality of invocations that were not included in the plurality of sample invocations with a specification of memory size for the larger plurality of invocations based on the calculated memory function increased by a factor of a delta seen in a predictive accuracy of the function.

13. A computer program product comprising a non-transitory computer readable storage having program instructions embodied therewith, the program instructions executable by a computer, to cause the computer to perform a method comprising:
selecting, at the computer system, a plurality of sample invocations of functions as a service from a larger plurality of invocations of functions as a service to be executed;

submitting for execution, from the computer system to a cloud service, the plurality of sample invocations of functions as a service and, for each sample invocation, submitting a specification of a memory size to be used for execution of each sample invocation;

determining, at the computer system, whether the specification of the memory size to be used for execution of each sample invocation results in unsuccessful execution of at least some of the plurality of sample invocations due to insufficient memory and, if so, adjusting the specification of the memory size for at least some of the sample invocations; and submitting for execution, from the computer system to a cloud service, at least those invocations in the larger plurality of invocations that were not included in the plurality of sample invocations.

14. The computer program product of claim 13, wherein each specified memory size to be used for execution of each sample invocation differs from another specified memory size by a step factor.

15. The computer program product of claim 14, further comprising:

determining, at the computer system, an estimate of a runtime memory consumption of each sample invocation;

adjusting, at the computer system, the specification of the memory size for at least some of the sample invocations by reducing the step factor;

when all sample invocations have run successfully, determining, at the computer system, an average of the runtime memory consumption for all sample invocations; and submitting for execution, from the computer system to a cloud service, at least those invocations in the larger plurality of invocations that were not included in the plurality of sample invocations with a specification of memory size for the larger plurality of invocations based on the average of the runtime memory consumption for all sample invocations.

16. The computer program product of claim 14, wherein adjusting the specification of the memory size for at least some of the sample invocations comprises:

when any of the plurality of sample invocations results in unsuccessful execution, iteratively increasing a number of sample invocations, and setting a current specification of the memory size based on a function of the current specification of the memory size and on the number of sample invocations until none of the plurality of sample invocations results in unsuccessful execution or until a maximum number of sample invocations has been reached.

17. The computer program product of claim 16, further comprising submitting for execution, from the computer system to a cloud service, at least those invocations in the larger plurality of invocations that were not included in the plurality of sample invocations with a specification of memory size for the larger plurality of invocations based on a final value of the current specification of the memory size from the iterative process.

18. The method of claim 14, wherein the plurality of sample invocations of functions are chosen randomly and the method further comprises:

determining, at the computer system, an estimate of a runtime memory consumption of each sample invocation;

calculating, at the computer system, a memory function based on a relationship of a size of an input data set to the determined runtime memory consumption and based on an average difference between a predicted memory usage and the determined runtime memory consumption; and submitting for execution, from the computer system to a cloud service, at least those invocations in the larger plurality of invocations that were not included in the plurality of sample invocations with a specification of memory size for the larger plurality of invocations based on the calculated memory function increased by a factor of a delta seen in a predictive accuracy of the function.

\* \* \* \* \*